United States Patent
Fong et al.

(10) Patent No.: US 12,250,247 B2
(45) Date of Patent: Mar. 11, 2025

(54) INFRASTRUCTURAL EDGE SECURITY AS A SERVICE

(71) Applicant: Dell Products L.P., Round Rock, TX (US)

(72) Inventors: Victor Fong, Melrose, MA (US); Sarah Evans, Parker, CO (US)

(73) Assignee: Dell Products L.P., Round Rock, TX (US)

( * ) Notice: Subject to any disclaimer, the term of this patent is extended or adjusted under 35 U.S.C. 154(b) by 255 days.

(21) Appl. No.: 17/806,635

(22) Filed: Jun. 13, 2022

(65) Prior Publication Data

US 2023/0403301 A1  Dec. 14, 2023

(51) Int. Cl.
*H04L 9/40* (2022.01)
(52) U.S. Cl.
CPC .................................. *H04L 63/20* (2013.01)

(58) Field of Classification Search
CPC ...................................................... H04L 63/20
See application file for complete search history.

(56) References Cited

U.S. PATENT DOCUMENTS

| | | | |
|---|---|---|---|
| 2020/0021618 A1* | 1/2020 | Smith | H04L 63/20 |
| 2021/0336899 A1* | 10/2021 | Tiagi | H04L 47/781 |
| 2022/0335340 A1* | 10/2022 | Moustafa | G06F 11/3003 |
| 2022/0374762 A1* | 11/2022 | Radhakrishnan | G06N 5/043 |
| 2022/0400123 A1* | 12/2022 | Ayoub | G06F 3/067 |

* cited by examiner

*Primary Examiner* — Carl G Colin
*Assistant Examiner* — Andrew Suh
(74) *Attorney, Agent, or Firm* — Workman Nydegger (57) ABSTRACT

Edge security is disclosed. Hosts included in a distributed infrastructure are equipped with data processing units that may be centrally managed using a control plane. Security policies can be selectively distributed to the hosts and localized at the hosts. Reactions to security violations can be initiated at the hosts in substantially real-time. The security policies may take various forms, including rule-based security policies and inference mode-based security policies.

20 Claims, 4 Drawing Sheets

INFRASTRUCTURAL EDGE SECURITY AS A SERVICE

FIELD OF THE INVENTION

Embodiments of the present invention generally relate to security systems, services, and operations. More particularly, at least some embodiments of the invention relate to systems, hardware, software, computer-readable media, and methods for security services at an infrastructure level and to edge security as a service.

BACKGROUND

Computing systems are continually changing. Much effort is being put into, in addition to cloud services and cloud infrastructure, edge services and edge infrastructure. The geographically distributed nature of edge infrastructure, however, can complicate infrastructure management and security. Unauthorized access to infrastructure and data can cause serious damage. The expansion of edge infrastructure complicates the process or providing security at least because the attack surface increases dramatically.

Security policies are difficult to enforce at the application level because significant effort must be made in developing software to enforce the security policies. In some instances, security policies are enforced at the operating system level. Because edge systems are distributed and heterogeneous in nature, users may not control the operating system. Further, workloads may be running on many different types and versions of operating systems. Implementing and enforcing security policies in this type of environment is challenging and often unreliable.

Another issue relates to task of distributing security policies. An edge infrastructure may include millions of hosts and security distribution, in light of the need to develop applications, the variety in operating systems and workloads running thereon, complicate the distribution process. This is further complicated by the fact that security policies change frequently over time.

Another security concern is the fact that many hardware providers do not have control over customer environments. Because some security software requires a secure environment, there is a danger that the security software may be compromised once installed in customer environments. In addition, the execution of security software to implement security policies requires compute resources and memory on the host. This reduces the resources available for other customer use cases.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate infrastructural edge security services. More particularly, at least some embodiments of the invention relate to systems, hardware, software, computer-readable media, and methods for providing security service in distributed infrastructure.

A data processing unit (DPU) is a device that may be included in, attached to or integrated into a host computing device. Examples of a host computing device may include a server computer, or other computing machine or device. Examples of host computing devices (hosts) include edge infrastructure such as edge server computers.

Figure 1:
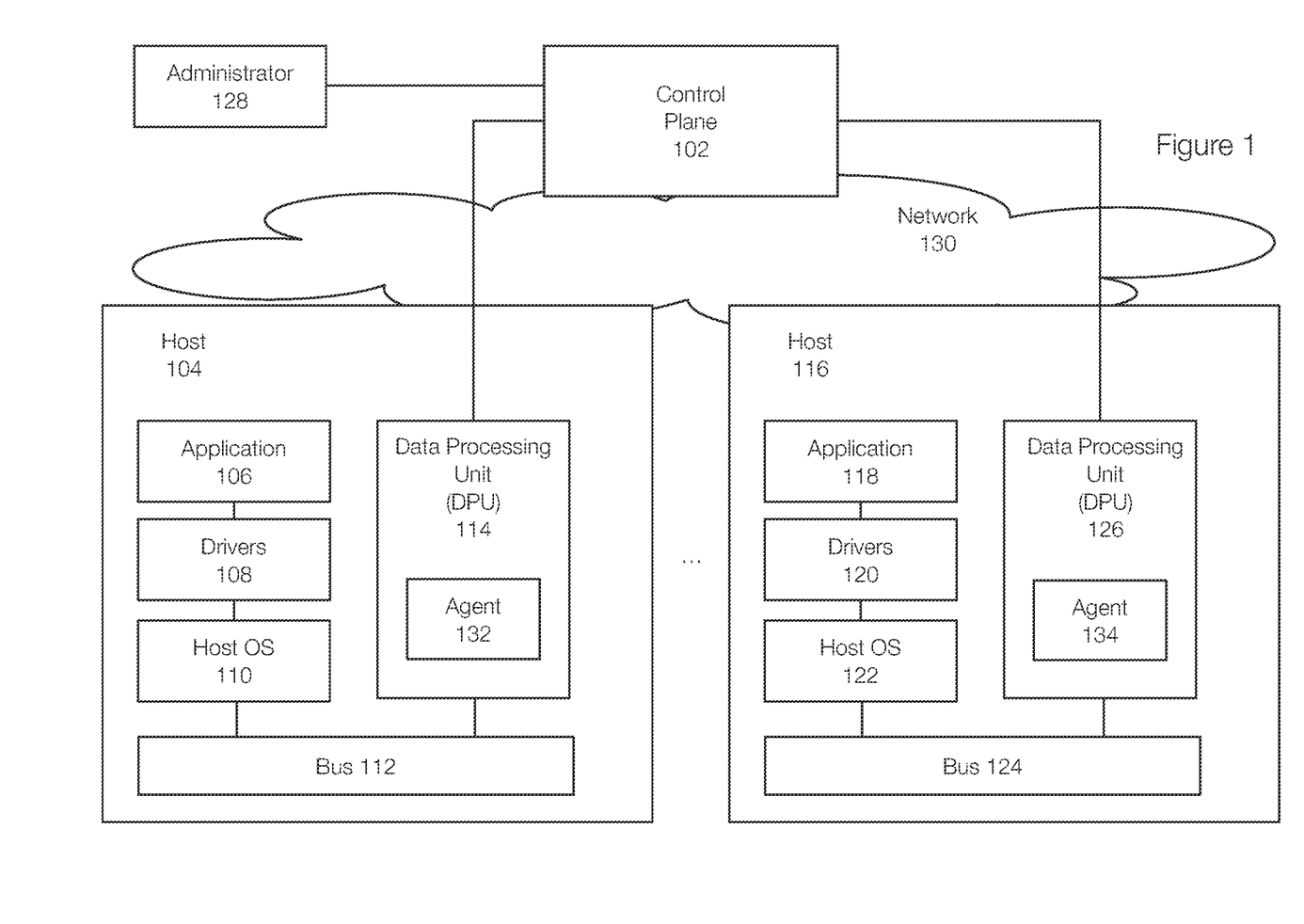
FIG. 1 discloses aspects of distributing security policies to a distributed infrastructure.

FIG. 1 discloses aspects of a DPU deployed to or integrated into a host. FIG. 1 illustrates a host 104 that includes a DPU 114. The DPU 114 may be hardware based and may be embodied as a system on a chip (SoC). In one example, the DPU 114 may be embodied as a smartNIC (Network Interface Card).

The host 104 includes a host OS 110, drivers 108, and applications, represented by the application 106. The DPU 114 may be connected to the host 104 via a bus 112. The host 116 is similarly configured to the host 104 and includes an application 118, drivers 120, a host OS 122, a bus 124, and a DPU 126. However, the OS 110 may differ from the OS 122 in type, version, or the like. The application 106 may be different than the application 118. The hosts 104 and 116 may be in different geographic locations and are representative of multiple hosts in a distributed edge infrastructure.

The DPU 114, even if integrated into the host 104 or installed as a component of the host 104, is positioned between the host 104 and a network 130. As a result, all network traffic between the host 104 and the network 130 passes through and/or is processed by the DPU 114. The DPU 126 is similarly positioned between the host 116 and the network 130. In one example the DPU 114 is invisible to the host 104. More specifically, the DPU 114 may be visible as a network card or other hardware in one example, but the host 104 has no visibility or access to processing inside the DPU 114.

The host 104 may view the DPU 114 as an onboard network interface controller. This allows the host 104 (or application 106, etc.) to interact with the DPU 114 via the bus 112 (e.g., PCIe). Advantageously, the host 104 and users cannot gain access to the DPU 114 and cannot access or change any software operating therein or memory contents of the DPU 114.

FIG. 1 illustrates that an administrator 128 may interact with the DPUs 114 and 126 via a control plane 102. The control plane 102 may centralize the functionality of the DPUs 114 and 126 and may be a server computer or other cloud compute device/system. The control plane 102 may present a user interface to administrators 128 (e.g., owners, users, or administrators of the infrastructure represented by the hosts 104 and 116. The control plane 102 performs certain security operations, which may include creating and distributing or pushing security policies to the DPUs 114 and 126. The control plane 102 allows security policies to be distributed selectively, based on host configuration, compute, OS flavor, or the like or combination thereof. The DPU 104 and 126 also allow an infrastructure provider to have a secured control point after delivering hardware to a customer.

Embodiments of the invention provide a mechanism that allows security services to be provided at an infrastructure level. In one example, a DPU is provided and configured such that network traffic to/from a host can be intercepted and analyzed. This allows the DPU to perform security operations with respect to the network data. Embodiments of the invention use a DPU and its ability to intercept network traffic to provide additional security measures transparent to the host and users.

Embodiments of the invention allow administrators to set, delete, change, monitor, and revoke security policies from a centralized location for distributed infrastructure. The control plane 102 allows an administrator to centrally manage and distribute security policies to any number of hosts. When the host receives a security policy, the host agent can apply customizations to transform the security policy into an executable configuration. Furthermore, when a security violation or a potential security violation is identified, the control plane 102 can react (perform a reaction) in a manner to protect the infrastructure as a whole, in addition to protecting a specific host.

Figure 2:
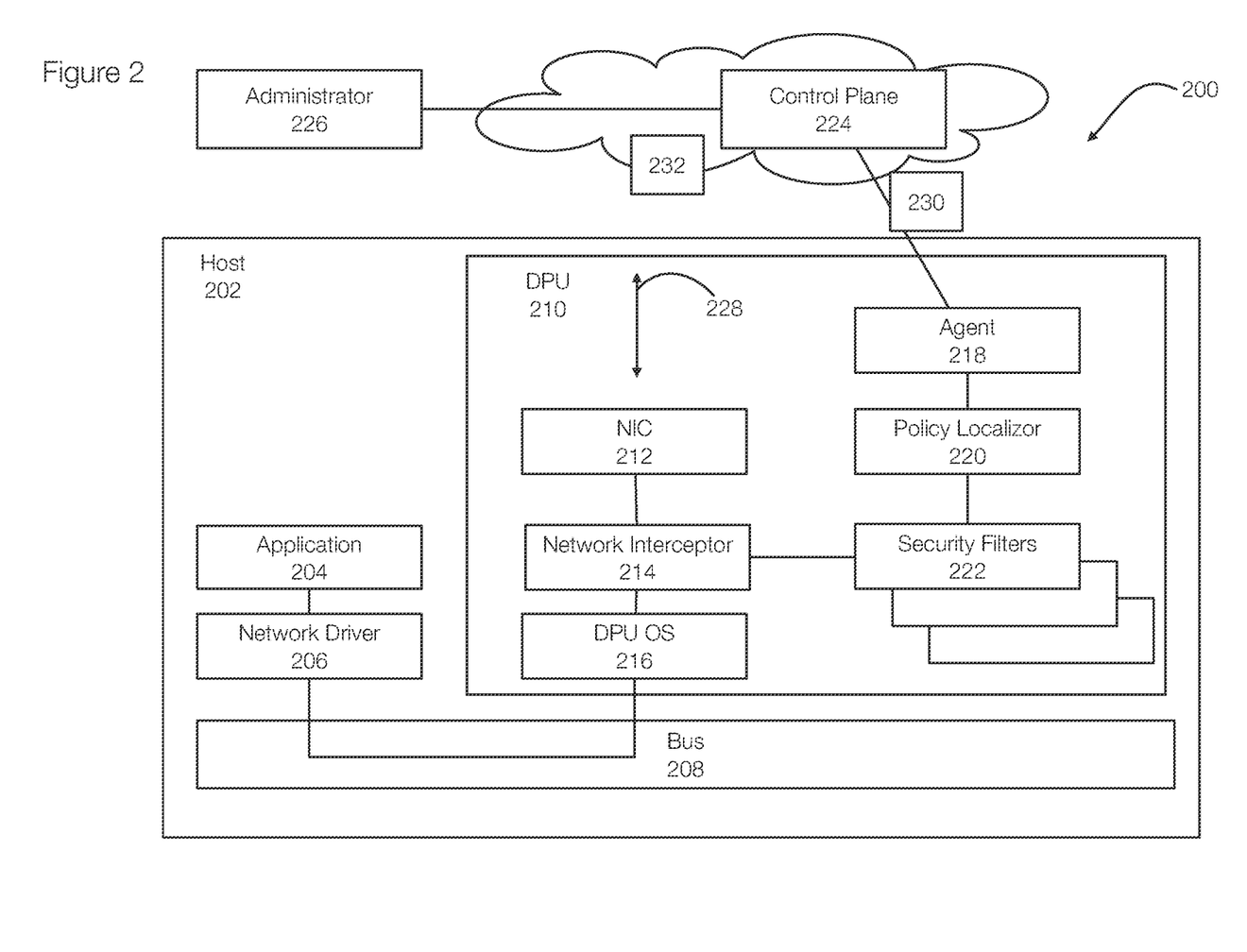
FIG. 2 discloses additional aspects of distributing security policies and discloses aspects of a data processing unit installed in the distributed infrastructure.

FIG. 2 discloses additional aspects of a data processing unit operating in a host. The host 202 may include applications (represented by application 204) that may use a network driver 206 to send receive network input/output 10. In this example, the network 10 is placed on the bus 208 by the application 204 using the network driver 206 and received from the bus 208 via the network driver 206.

Before the host 202 (or other hardware or infrastructure) is delivered to a customer or user, the DPU 210 is installed in the host 202. The DPU 210 may be a system on a chip (SoC) and may include a NIC 212. The DPU 210 may be a SmartNIC. An agent 218 is also installed in the DPU 210. For security purposes, the installation of the DPU 210 and the agent 218 in in the DPU 210 is typically performed by the provider (e.g., manufacturer) of the host 202.

This ensures that the DPU 210 provides a locked down environment that is only accessible by a specific entity, such as the hardware provider or other provider. Thus, the DPU 210, the DPU OS 216, and the agent 218 are installed, in one example, prior to delivery of the host 202 to a user or customer. This allows the provider to provide security services using a DPU 210 that is under the control of the provider.

The agent 218 may be software that runs inside the DPU 210. The agent 218 is configured to communicate with the control plane 224. This allows the agent 218 to listen for new policies, receive security policies, and to provide alerts and notifications via the control plane 224 (or to the host 202).

The control plane 224, by way of example, is a centralized control plane that can be hosted on infrastructure such as cloud (public, hybrid, private) infrastructure. The control plane 224 may provide a user interface to a user such as an administrator 226. The control plane 224 is also configured to communicate securely with the agent 218.

The operation of the security system 200 may include preparatory actions or stages prior to runtime. For example, a provisioning stage may be performed. The provisioning stage may occur during manufacture or in preparation for shipping to a customer such that the hosts 202 are provisioned in a secure environment. Provisioning may include installing the DPU 210 in the host 202 and installing the agent 218 in the DPU 210. Next, a secure network connection may be established between the DPU 210 and the control plane 224, which control plane 224 may have been previously deployed or created. This allows the DPU 210 to be registered with the control plane 224. The registration is accomplished, by way of example, prior to delivery to a customer or user.

The control plane 224 may be specific to an entity. All of the infrastructure (e.g., hosts) are registered with that entity's control plane 224. Alternatively, multiple entities may have an account with the control plane 224. This allows each entity's infrastructure to be configured independently of other entities. An entity can log in to the control pane 226 to administer the entity's infrastructure and related security policies.

Once the host 202 is provisioned, the host 202 may be shipped to the customer and installed at the customer's site. Next, the host 202 (or more specifically the DPU 210) may be configured. In one example, an administrator 226 may log on to the control plane 224. This allows the administrator 226 to view the hosts that belong to the administrator's organization, including the host 202 that has been deployed or installed at the customer site. The control plane 224 may allow the administrator 226 to assign hosts to groups, apply tags to the hosts (e.g., for localization) and the like.

Next, a security policy 230 may be created (or selected from a list of available security policies. The security policy 230 can take various forms and may be based on implementation. For example, the security policy 230 may be rule-based and include rules, such as access/block list. The security policy 230 may be or include a machine learning model (also referred to as an inference model). The machine learning model may be selected from a model marketplace. Alternatively, the administrator 226 may upload a custom model. In these examples, the machine learning model may be configured to generate inferences about the network traffic. The inferences may give a probability or confidence as to whether a security violation exists. Alternatively, the security policy may be protocol or content based, such as image recognition for network content. In another example, the machine learning model may generate inferences based on image recognition, and attributes such as biometric attributes. The machine learning model may be able to infer whether network traffic is a security risk or not based on images, biometric attributes in the network data, or the like.

The security policy 230 may be executed continuously, or at a frequency such that is time-based or based on another factor or characteristic. For instance, the security policy may be executed every minute, every five minutes, or the like. The security policy may be executed for each packet (packet-based frequency) or the like.

The administrator 226 may also set a matching policy 232. The matching policy 232 is configured to identify or define the hosts that should receive the security policy 230 being created/configured. The matching policy 232 may be based on geographical location, hardware models, operating systems, or the like or combination thereof.

The security policy 230 may also include or specify a reaction. If the security policy detects a security issue or a potential security issue, the reaction may be performed by the DPU 210 (e.g., by the agent 218). The reaction may be to drop a packet, shut down the network card, alert the administrator, or the like or combination thereof. When the security policy 230 is a machine learning model, the reaction may be triggered based on a confidence score of the inference model.

Once the security policy 230 and/or matching policy 232 are prepared, the administrator 226 may distribute the security policy 230 to the matching DPUs. The relevant agents, such as the agent 218, receive the security policy 230, along with relevant artifacts. Relevant artifacts may include the rules, (e.g., an access/block list), the machine learning model, and the like.

The agent 218 may use or include a policy localizor 220 to implement the security policy received from the control plane 224. The policy localizor 220 may transform the security policy for the host 202. The transformation may be based on implementation. For example, userspace, DPDK (Data Plane Development Kit) and SCP (Secure Copy Protocol) based solutions can be implemented. The configuration of the security policy 230 at the DPU 210, such as restricting to service mesh access, can also be matched with the host 202. Network intercepts may be configured. If the security policy includes a machine learning model, the agent 218 prepares an execution environment to execute the inference model based on the frequency.

Once the security policy is configured and implemented (e.g., the DPU 210 is ready to intercept network traffic 228, the machine learning model is configured), the DPU 210 is ready to run. At runtime, network traffic is ingested into the NIC 212, the network interceptor 214 intercepts the network traffic 228 and the network traffic 228 is processed by the security filters 222, which implement the security policy 230. Thus, the filters 222 may include the machine learning model, rules, or other deterministic security processes.

More specifically, when the security policy 230 is deterministic (e.g., rule-based), the security filters 222 may flag a packet and the reaction is executed by the agent 218.

When the security policy 230 is a machine learning or inference model, the machine learning model may operate at a given frequency. In one example, network traffic logs may be the input to the machine learning model. The machine learning model then performs, in one example, binary classification to determine if there is a potential or actual security violation. The agent 218 may trigger the reaction specified in the security policy based on the inference result of the machine learning model (or filter 222). If the reaction is based on a confidence score, the agent 218 may select a reaction corresponding to the confidence score. This allows multiple reactions and may allow, for example, stronger or more urgent reactions for higher confidence scores.

Figure 3:
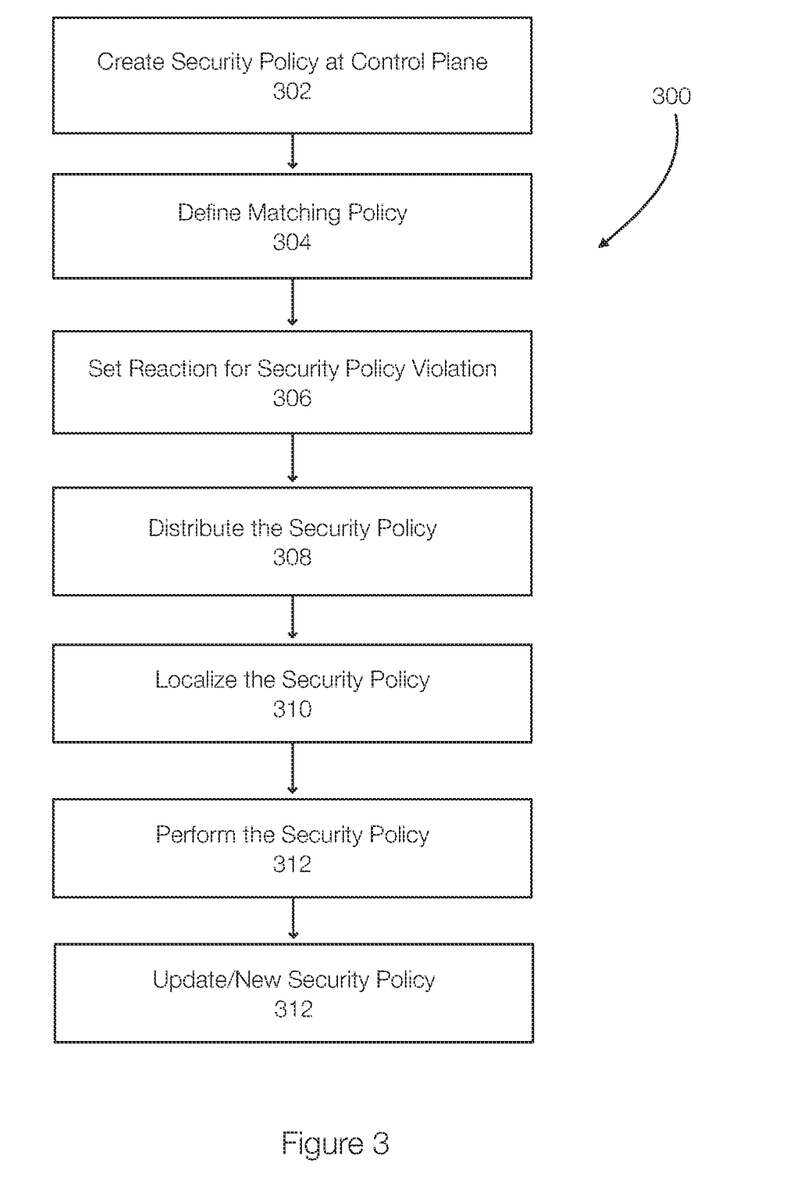
FIG. 3 discloses aspects of performing security operations.

FIG. 3 discloses aspects of edge security as a service. In the method 300, a user may create 302 a security policy at a control plane. Creating 302 the security policy may include structuring the security policy based on implementation, selecting/creating a machine learning model configured to generate inferences related to security violations, or the like. The machine learning model may be trained using data corresponding to security violations. The training data may be actual data collected from use cases or generated data.

Next, a matching policy is defined 304. The matching policy allows a user to identify the hosts that should receive and implement the security policy that has been created or configured. This allows a user to centrally manage the security policies that are performed in a distributed geography and allows a user to account for location, operating system, resources, or the like. Different hosts may receive different security policies.

A reaction for a security violation may also be set 306 and included in the security policy. The reaction may include multiple reactions, where each of the reactions is based on specific violations or levels of violations, confidence scores, levels of confidence scores, or the like. When the security policy is a machine learning model, the confidence score may influence or determine the reaction that is performed.

Once the security policy and matching policy are prepared, the security policy is distributed 308 to hosts that match the matching policy. Each of the hosts can then localize 310 the security policy. Localizing a policy may include transforming the policy into an executable or adapting the policy to account for local factors. For example, certain IP (Internet Protocol) addresses may be different in different locations. The security policies can be localized to account for these types of variations that may be due to geography or for other variations. If the security policy includes a machine learning model, localizing 310 the security policy may include preparing an execution environment.

The security policy is then performed 312, which includes performing reactions when security violations are detected, suspected, or inferred. Over time, the security policy may be updated 312, replace with a new security policy, or the like. Multiple security policies may execute at a host. A host may have, by way of example, multiple rule-based policies, multiple inference-based policies, or the like or combination thereof.

Performing 312 the security policy may depend on the type of security policy. A deterministic security policy may generate outputs that are either true or false. An inference-based security policy may generate confidence scores that are more nuanced.

Embodiments of the invention include a security service at an infrastructure level (e.g., edge infrastructure level) that is transparent to the host environment. A distribution mechanism is provided that can be centrally controlled such that security policies can be distributed across all edge infrastructure. Localization allows the security policies to be additionally customized. Using DPUs, the security settings are transparent to users of the edge hosts.

Embodiments allows localized security policies to be distributed continuously and allows the security policies to be kept up to date with the latest industrial information, regional regulations, customer/company policies, and the like. In addition, security policies can be executed using inference models. To identify both violations and reactions.

Advantageously, network and system logs to not need to be transmitted to a centralized location for processing. This saves valuable time when a security violation occurs. The agent at the DPU can react in real time to prevent or reduce damage related to the security violation.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations including security operations, network security operations, machine learning model and inference operations, reaction performance operations, security policy creation, distribution, and localization operations, or the like.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VM).

Particularly, devices in the operating environment may take the form of software, physical machines, containers or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines, containers, or virtual machines (VM), though no particular component implementation is required for any embodiment.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing. Network traffic may include data, headers, metadata, or the like.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method, comprising: distributing a security policy to hosts in a distributed infrastructure, wherein each of the hosts include a data processing unit, wherein the hosts that receive the security policy are identified using a matching policy, wherein the security policy is received at a data processing unit in each of the hosts, localizing the security policy at each of the hosts, by an agent in the data processing unit, executing the security policy at each of the hosts, and performing a reaction defined in the security policy when a security violation is identified.

Embodiment 2. The method of embodiment 1, further comprising creating the security policy at a control plane, wherein the control plane is configured to securely communicate with the data processing units.

Embodiment 3. The method of embodiment 1 and/or 2, further comprising generating the matching policy at the control plane, wherein the matching policy specifies one or more of a location, an operating system, or memory.

Embodiment 4. The method of embodiment 1, 2, and/or 3, wherein the security policy comprises a machine learning model configured to generate an inference, the inference including a confidence score.

Embodiment 5. The method of embodiment 1, 2, 3, and/or 4, further comprising performing the reaction when the confidence score exceeds a threshold confidence score.

Embodiment 6. The method of embodiment 1, 2, 3, 4, and/or 5, wherein the data processing unit deploys the machine learning model in a secure environment in the data processing unit.

Embodiment 7. The method of embodiment 1, 2, 3, 4, 5, and/or 6, wherein the data processing unit is visible as a network card to the host, wherein the host has no access to the data processing unit and wherein processing inside the data processing unit is invisible to the host.

Embodiment 8. The method of embodiment 1, 2, 3, 4, 5, 6, and/or 7, wherein the control plane comprises a central control point for the distributed infrastructure.

Embodiment 9. The method of embodiment 1, 2, 3, 4, 5, 6, 7, and/or 8, further comprising updating or replacing the security policy.

Embodiment 10. The method of embodiment 1, 2, 3, 4, 5, 6, 7, 8, and/or 9, wherein the security policy includes one or more of a deterministic security policy and/or a machine learning model and/or a content-based security policy and/or a protocol-based security policy.

Embodiment 11. A method for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-11.

Embodiment 13. A data processing unit comprising: a smart network interface card that is installed on a host, an agent configured to receive and implement a security policy received from a control plane in the smart network interface card installed on the host, wherein the security policy includes at least one of a deterministic security policy and a machine learning model configured to generate an inference regarding whether network traffic violates the security policy, and a localizer configured to adapt the security policy to the host.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon.

Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' or 'engine' or 'agent' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
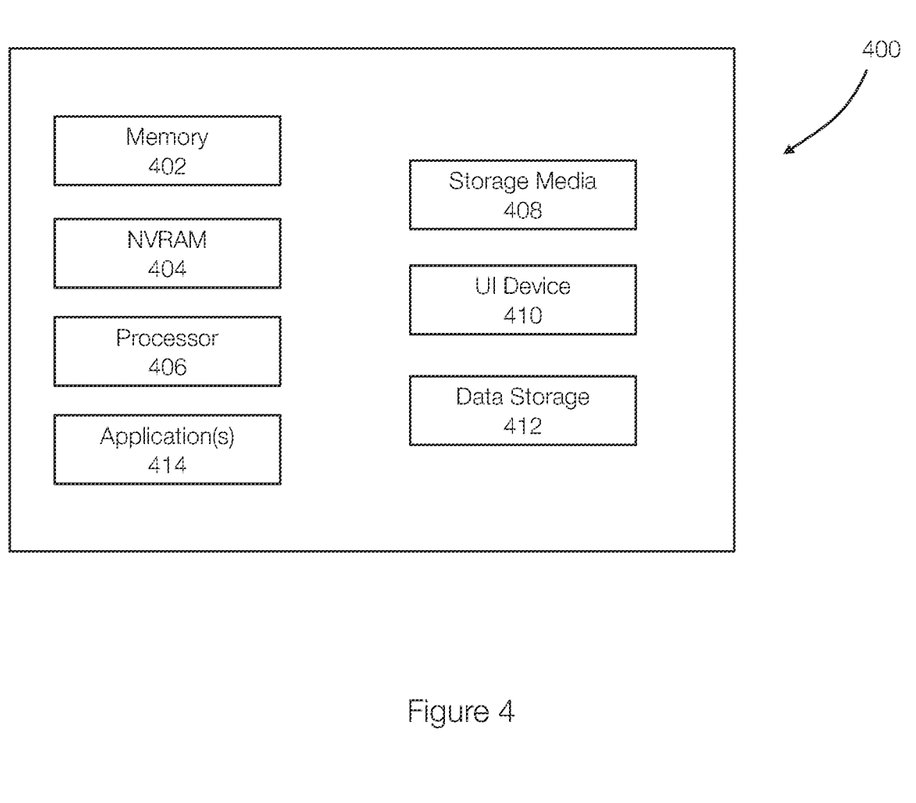
FIG. 4 discloses aspects of a computing device, a computing system, or a computing entity.

With reference briefly now to FIG. 4, any one or more of the entities disclosed, or implied, by the Figures and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random-access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid-state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
distributing a security policy to selected data processing units in a distributed infrastructure from a control plane that is central to the data processing units,
wherein each of the data processing units is associated with a corresponding host and each of the data processing units includes an agent in a smart network interface card configured to communicate with the control plane, wherein the selected data processing units that receive the security policy are identified using a matching policy, wherein
the data processing units are locked down environments that are only controllable by the control plane through the agent in the smart network interface card;
localizing the security policy at each of the selected data processing units for the corresponding hosts by the corresponding agent;
executing the security policy at each of the hosts associated with the selected data processing units; and
performing a reaction defined in the security policy when a security violation is identified.

2. The method of claim 1, further comprising creating the security policy at the control plane, wherein the control plane is configured to securely communicate with the data processing units.

3. The method of claim 1, further comprising generating the matching policy at the control plane, wherein the matching policy specifies one or more of a location, an operating system, or memory.

4. The method of claim 1, wherein the security policy comprises a machine learning model configured to generate an inference, the inference including a confidence score.

5. The method of claim 4, further comprising performing the reaction when the confidence score exceeds a threshold confidence score.

6. The method of claim 5, wherein the data processing unit deploys the machine learning model in a secure environment in the data processing unit.

7. The method of claim 1, wherein the data processing unit is visible as a network card to the host, wherein the host has no access to the data processing unit and wherein processing inside the data processing unit is invisible to the host.

8. The method of claim 1, wherein the control plane comprises a central control point for the distributed infrastructure.

9. The method of claim 1, further comprising updating or replacing the security policy.

10. The method of claim 1, wherein security policy includes one or more of a deterministic security policy and/or a machine learning model and/or a content-based security policy and/or a protocol-based security policy.

11. A non-transitory storage medium having stored therein instructions that are executable by one or more hardware processors to perform operations comprising:
distributing a security policy to selected data processing units in a distributed infrastructure from a control plane that is central to the data processing units, wherein each of the data processing units is associated with a corresponding host and each of the data processing units includes an agent in a smart network interface card configured to communicate with the control plane, wherein the selected data processing units that receive the security policy are identified using a matching policy, wherein
the data processing units are locked down environments that are only controllable by the control plane through the agent in the smart network interface card;
localizing the security policy at each of the selected data processing units for the corresponding hosts by the corresponding agent;
executing the security policy at each of the hosts associated with the selected data processing units; and
performing a reaction defined in the security policy when a security violation is identified.

12. The non-transitory storage medium of claim 11, further comprising creating the security policy at the control plane, wherein the control plane is configured to securely communicate with the data processing units.

13. The non-transitory storage medium of claim 11, further comprising generating the matching policy at the control plane, wherein the matching policy specifies one or more of a location, an operating system, or memory.

14. The non-transitory storage medium of claim 11, wherein the security policy comprises a machine learning model configured to generate an inference, the inference including a confidence score.

15. The non-transitory storage medium of claim 14, further comprising performing the reaction when the confidence score exceeds a threshold confidence score.

16. The non-transitory storage medium of claim 15, wherein the data processing unit deploys the machine learning model in a secure environment in the data processing unit.

17. The non-transitory storage medium of claim 11, wherein the data processing unit is visible as a network card to the host, wherein the host has no access to the data processing unit and wherein processing inside the data processing unit is invisible to the host.

18. The non-transitory storage medium of claim 11, wherein the control plane comprises a central control point for the distributed infrastructure, further comprising further comprising updating or replacing the security policy.

19. The non-transitory storage medium of claim 11, wherein the security policy includes one or more of a deterministic security policy and/or a machine learning model and/or a content-based security policy and/or a protocol-based security policy.

20. A data processing unit comprising:
a smart network interface card that is installed on a host, wherein the smart network interface card is configured as a secure environment that in only accessible by a control plane that is remote from the host such that the smart network interface card is controllable and changeable only by the control plane;
an agent operating in the smart network interface card, wherein the agent is configured to receive and implement a security policy received from the control plane in the smart network interface card installed on the host, wherein the security policy includes at least one of a deterministic security policy and a machine learning model configured to generate an inference regarding whether network traffic violates the security policy; and
a localizer operating in the smart network interface card, wherein the localizer is configured to adapt the security policy to the host.

* * * * *